J. W. GAINES.
Millstone Dress.
No. 84,349.            Patented Nov. 24, 1868.
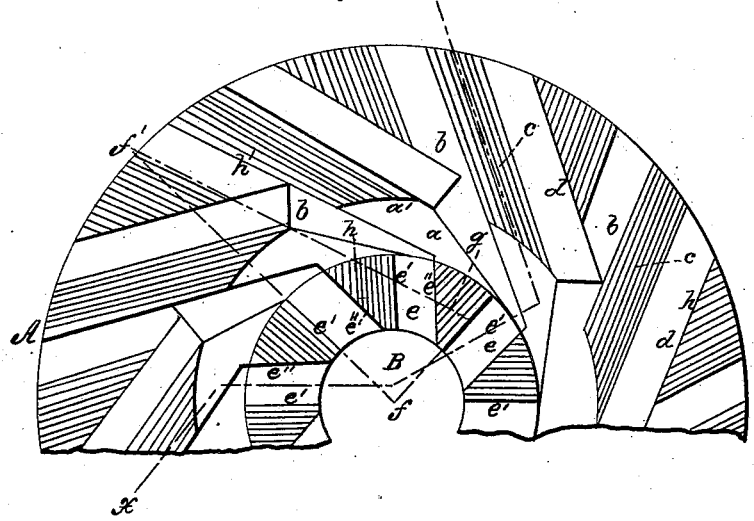
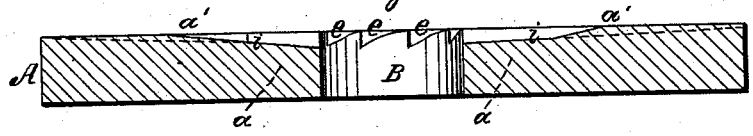

JAMES W. GAINES, OF CLARKSVILLE, TEXAS.

Letters Patent No. 84,349, dated November 24, 1868.

IMPROVED MILLSTONE-DRESS.

The Schedule referred to in these Letters Patent and making part of the same.

*To all whom it may concern:*

Be it known that I, JAMES W. GAINES, of Clarksville, in the county of Red River, and State of Texas, have invented a new and improved Millstone-Dress; and I do hereby declare that the following is a full, clear, and exact description thereof, which will enable those skilled in the art to make and use the same, reference being had to the accompanying drawings, forming part of this specification.

This invention relates to a new and improved dress for millstones, whereby the grain is better distributed than usual in passing between the stones, the grain more thoroughly ground, and a larger product of flour obtained from a given quantity of grain.

In the accompanying sheet of drawings—

Figure 1 is a plan or face view of a millstone provided with a dress made according to my invention.

Figure 2, a vertical section of the same, taken in the line $x\ x$.

Similar letters of reference indicate corresponding parts.

A represents a millstone.

B, the eye of the same.

In the face of the stone there is made a concentric furrow, $a$, of such proportion that the space between the eye B and the outer edge, $a'$, of said furrow, will be equal to one-half the space between the shearing-edge of $a$ to the periphery of the stone.

The stone is laid out into a number of sections corresponding to the size of the stone, the width of the furrows varying from three-quarters of an inch to an inch and a half, the leading furrows $b$, leading bands $c$, and the secondary furrows $d$, together with the concentric furrow $a$, and the furrows $e$, within the concentric furrow $a$, being of a uniform width.

The bevel of the shearing-edges of the leading furrows $b$ is obtained by drawing a radial line, $f f'$, and from the centre of the eye B drawing a radial line, $f g$, at right angles with $f f'$, $f g$ being set off a distance equal to one-third the length of $f f'$, and a line, $h$, drawn from $g$ to $f'$, the line $h$ giving the bevel of the shearing-edges of the furrows $b$, the opposite sunken edges, $h'$, of the furrows $b$, being drawn parallel with $h$.

The furrows are all dressed concave, as shown at $i$ in fig. 2.

The shearing-edges $e'$, of the furrows $e$, within the concentric furrow $a$, are drawn radially from the centre of the eye B, the opposite abrupt edges, $e''$, being drawn parallel with $e'$, the depth of the sunken edges of all the furrows being from one-eighth to five-eighths of an inch.

By this arrangement of the furrows and bands there is a greater crushing action than hitherto, the concentric furrow $a$ causing a more rapid and equal distribution of the crushed material to the grinding-portions of the outer surface, the surfaces of the bands being finely serrated throughout, parallel with their edges.

I do not claim broadly the use of a concentric furrow, as I am aware that the same has been used before; but What I do claim, and desire to secure by Letters Patent, is—

The millstone-dress, formed by the annular-bevelled furrow $a$, the leading furrows $b$, passing through the annular furrow, the radial furrows $e$, connecting with the leading furrows at an angle, and the secondary furrows $d$, all laid out in the manner herein shown and described.

JAMES W. GAINES.

Witnesses:
PHEATON JOHNSON,
H. C. HOOKS.